US010025625B2

(12) United States Patent
Thiruvengadachari et al.

(10) Patent No.: US 10,025,625 B2
(45) Date of Patent: Jul. 17, 2018

(54) BATCHED TASKS

(71) Applicant: Microsoft Technology Licensing, LLC., Redmond, WA (US)

(72) Inventors: Prashant Thiruvengadachari, Bothell, WA (US); Sanyam Sharma, Redmond, WA (US); Daniel Amirault, Berlin (DE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 39 days.

(21) Appl. No.: 15/224,190

(22) Filed: Jul. 29, 2016

(65) Prior Publication Data

US 2017/0286159 A1    Oct. 5, 2017

Related U.S. Application Data

(60) Provisional application No. 62/316,358, filed on Mar. 31, 2016.

(51) Int. Cl.
*G06F 9/46* (2006.01)
*G06F 9/48* (2006.01)
*G06F 17/30* (2006.01)

(52) U.S. Cl.
CPC .......... *G06F 9/4881* (2013.01); *G06F 9/4843* (2013.01); *G06F 17/30339* (2013.01)

(58) Field of Classification Search
None
See application file for complete search history.

(56) References Cited

U.S. PATENT DOCUMENTS

| 8,694,994 | B1 | 4/2014 | Vincent et al. |
| 8,738,706 | B1 | 5/2014 | Grieve et al. |
| 8,825,710 | B2 | 9/2014 | Gillen et al. |
| 8,990,295 | B2 | 3/2015 | Lau et al. |
| 2002/0087649 | A1* | 7/2002 | Horvitz ............... G06Q 10/107 709/207 |
| 2003/0149717 | A1 | 8/2003 | Heinzman |
| 2007/0220516 | A1 | 9/2007 | Ishiguro et al. |
| 2008/0052712 | A1 | 2/2008 | Gustafson et al. |
| 2010/0083255 | A1 | 4/2010 | Bane et al. |
| 2010/0153952 | A1* | 6/2010 | Linder .................. G06F 9/4881 718/101 |

(Continued)

FOREIGN PATENT DOCUMENTS

EP    2503733 A1    9/2012

OTHER PUBLICATIONS

Qinyi Wu, Calton PU; Modeling and Implementing Collaborative Editing Systems with Transactional Techniques; Oct. 9-12, 2010.*

(Continued)

*Primary Examiner* — Dong Kim
(74) *Attorney, Agent, or Firm* — Merchant & Gould P.C.

(57) ABSTRACT

Reducing computational load for systems tracking tasks performed in a shared electronic environment allows for users to receive more nuanced notifications about the use of the shared of the electronic environment, more frequent notifications, or let the systems use those resources for other purposes. The systems and methods discussed herein provide for batching and queueing of tasks to reduce the computational load of systems and thereby improve the systems themselves and the user experience.

19 Claims, 8 Drawing Sheets

(56) References Cited

U.S. PATENT DOCUMENTS

| | | | |
|---|---|---|---|
| 2012/0150942 A1 | 6/2012 | Alev et al. | |
| 2014/0053160 A1* | 2/2014 | Fee | G06F 9/4843 718/101 |
| 2014/0082093 A1* | 3/2014 | Savage | H04L 41/50 709/206 |
| 2014/0095660 A1 | 4/2014 | Chan | |
| 2014/0344813 A1 | 11/2014 | Jamjoom et al. | |
| 2014/0344814 A1* | 11/2014 | Jamjoom | G06F 9/4881 718/101 |
| 2015/0356116 A1* | 12/2015 | Lin | G06F 17/30212 707/613 |
| 2016/0021614 A1 | 1/2016 | Liu et al. | |
| 2016/0048486 A1 | 2/2016 | Lopategui | |

OTHER PUBLICATIONS

"International Search Report and Written Opinion Issued in PCT Application No. PCT/US2017/024395", dated Jul. 7, 2017, 14 Pages.

Wu, et al., "Modeling and implementing collaborative editing systems with transactional techniques", In Proceedings of International Conference on Collaborative Computing: Networking, Applications and Worksharing, Oct. 9, 2010, 10 Pages.

"Visibility Timeout", Published on: Jan. 18, 2013 Available at: http://docs.aws.amazon.com/AWSSimpleQueueService/latest/SQSDeveloperGuide/AboutVT.html.

Rowe, Trevor, "Polling Messages from a Amazon SQS Queue", Published on: Apr. 7, 2015 Available at: https://ruby.awsblog.com/post/Tx30PN6APFL9WR8/Polling-Messages-from-a-Amazon-SQS-Queue.

"Amazon Simple Queue Service", Published on: Dec. 8, 2015 Available at: http://docs.amazonaws.cn/en_us/AWSSimpleQueueService/latest/SQSDeveloperGuide/sqs-dg.pdf.

"Batch Processing", Retrieved on: Mar. 1, 2016 Available at: https://docs.mulesoft.com/mule-user-guide/v/3.6/batch-processing.

Shahan, Robin, "Get started with Azure Queue storage using .NET", Retrieved on: Mar. 1, 2016 Available at: https://azure.microsoft.com/en-in/documentation/articles/storage-dotnet-how-to-use-queues/.

* cited by examiner

BATCHED TASKS

CROSS-REFERENCE TO RELATED APPLICATIONS

This application claims benefit of U.S. Provisional Patent Application No. 62/316,358 titled "BATCHED TASKS" filed on Mar. 31, 2016, the entirety of which is hereby incorporated by reference.

BACKGROUND

Users working in a cloud environment or other shared electronic working spaces, such as coauthored documents, often want to know what has been done within the shared workspace within a given period of time or after a set amount of activity has occurred. For example, a systems administrator may wish to know what documents stored on a server have been edited within the last twenty-four hours or a writer may wish to know when collaborators have added (or subtracted) enough content to constitute more than minor edits to a document. Prior systems involved keeping a database of the actions taken in a shared workspace and querying the database for relevant actions, which requires a significant expenditure of processing resources to repeatedly query the database or the setup and maintenance of a schema for holding the actions in the database for later lookup.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods are provided herein for enabling a more efficient batching of actions taken in a shared workspace that reduce the use of processing resources compared to prior systems and methods. As a task is received in a shared electronic workspace, the task is added to a table and a determination is made whether the task meets monitoring user supplied criteria for whether the task belongs to a batch, and if so, the task is added to a batch. Batches are held in a queue until a trigger condition, defined by a monitoring user, occurs at which time a notification is sent to the monitoring user and/or the tasks are executed in the shared electronic workspace. By employing aspects of the present disclosure, processing resources are saved by not having to rely on the heavy use of relational databases.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1:
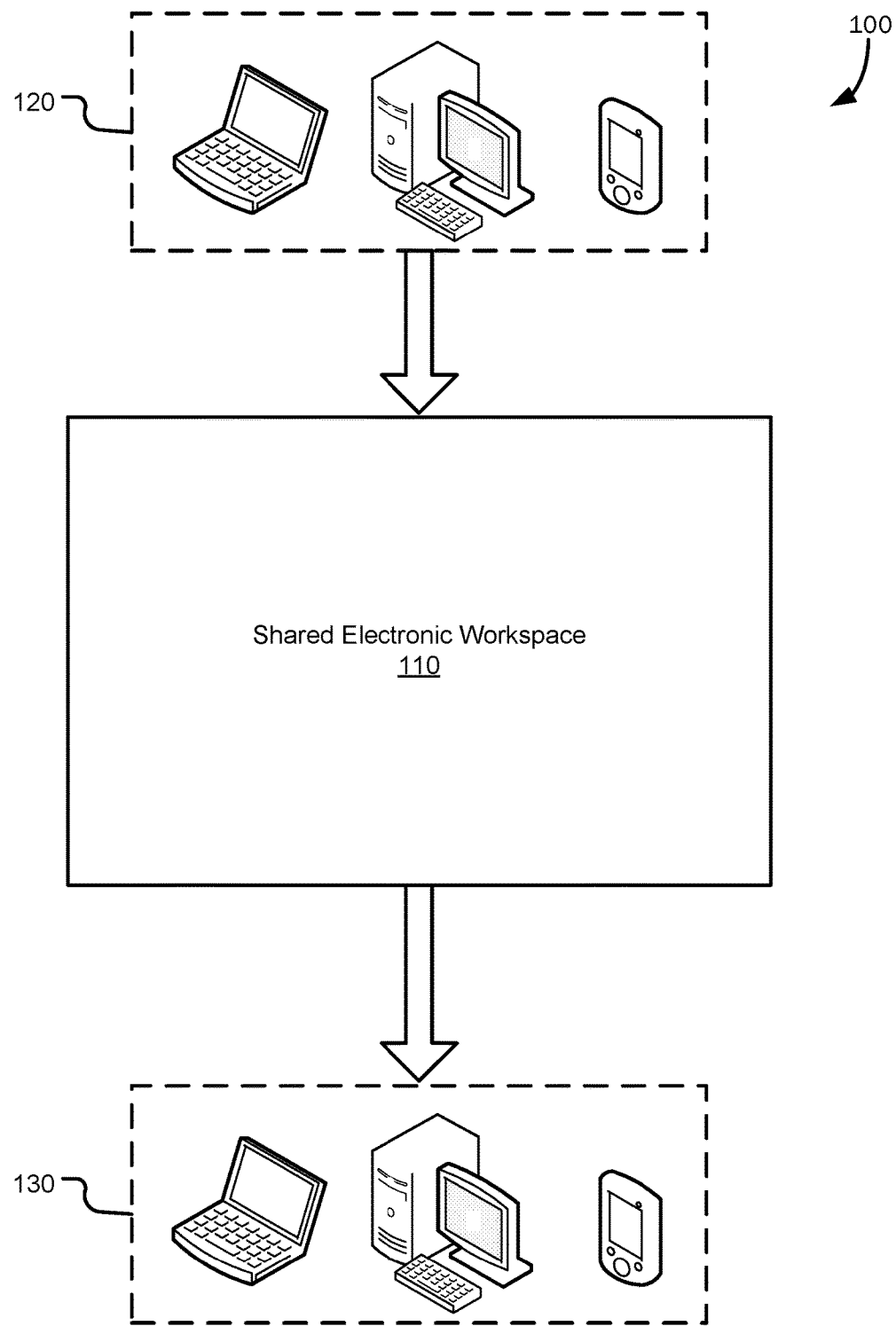
FIG. 1 illustrates an example environment in which the batching of tasks may be practiced.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Systems and methods are provided herein to enable a more computationally efficient way to process tasks in a shared electronic workspace (SEW). As writers perform tasks in the SEW, those tasks are written to a table, and a cache determines how to batch the tasks for reporting to monitoring users. User-supplied definitions for which tasks are to be grouped into batches, how long a batch should be collected (e.g., n minutes/hours/days, n tasks, or whichever time or task trigger occurs first), and how a batch is to be reported are held by the cache, and may be added on-the-fly to determine whether to add a task to one or more existing batches or to create a new batch. Batches are held in a queue until their triggers occur, at which time a notification on the included tasks is generated and transmitted to a monitoring user and/or the tasks are executed in the SEW, and the batch is removed from the queue. While the notification is generated, tasks that would have been added to the batch being reported are placed into a new batch in the queue for reporting later, and the monitoring user is provided with the requested information without needing to generate computationally complex queries or to format a database according to a complex schema.

FIG. 1 illustrates an example environment 100 in which the batching of tasks may be practiced. The example environment 100 includes a SEW 110, one or more writers 120 that access the SEW 110, and a receiver 130 that receives the batched tasks, or notifications thereof. In various aspects, the SEW 110 may be a file-hosting server, a server monitoring a distributed network of workstations, a shared workstation, a cloud-hosted document, or a locally-hosted document that has been shared. The writers 120 and receiver 130 comprise computing devices, and in various aspects, a writer 120 may also be a receiver 130. Similarly, the receiver 130 may be hosting the SEW 110, and using the notifications to commit tasks to a document or server state, allowing for tasks to be combined in batches; reducing processing resources used by the system compared to implementing the equivalent action via multiple uncombined tasks.

The SEW 110, the writer(s) 120, and the receiver 130 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. The hardware of these computing systems is discussed in greater detail in regard to FIGS. 5, 6A, 6B, and 7.

In various aspects, the SEW 110 is accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link). Data are transferred between the SEW 110, the writer(s) 120, and the receiver 130 for sharing tasks, notifications, and other communications. As will be understood, the network may be exclusively used for the distribution of tasks and reports thereon or may be accessed by the computing devices for communication with devices that are not part of the distribution group.

The receiver 130 sets the conditions for which tasks will be batched, how frequently batches are generated, and how the batches are delivered to the receiver 130. As will be appreciated, depending on the nature of the SEW 110, the nature of the tasks and the batches thereof may differ. For example, if the SEW 110 were a server storing multiple documents, the tasks may include deletions, creations, or modifications to documents, as well as downtime events (power outages, reboots, etc.). Similarly, if the SEW 110 were a shared document, the tasks may include the accessing, saving, versioning, commenting, or authoring of the shared document. For example, a batch of server tasks may be used to create a notification of how many deletions, creations, or modifications to documents were made by specified users in a given period of time.

As will be appreciated, the batches comprise the specified tasks, but counteractive or additive tasks may be compressed in a batch, to reduce the number of function calls or transmissions needed to process the batch. For example, a batch in a shared document where a writer 120 entered some text (a first task) and then deleted that text (a second task), the tasks in the batch may be compressed so that the batch is comprised of no tasks, as the first task was counteracted by the second task. Similarly, when a writer 120 enters some text (a first task) and then enters some more text (a second task), those tasks may be compressed into one task, as they are additive, and the batch will comprise one task that includes all of the entered text. By compressing tasks at a batch level, processing the tasks (for execution via a callback or for reporting in a notification) may be simplified, and fewer computing resources are spent in executing the aggregated task or fewer and smaller transmissions may be made to remote systems, thus conserving bandwidth.

In aspects where the receiver 130 requests notifications, the batch definition set by the receiver 130 defines the delivery method for the notifications. For example, notifications may be transmitted via email, text message, or an in-program dialog or pop-up. To illustrate, a systems administrator may set up a batch definition that batches all synchronization errors within a SEW 110 of a server or cloud computing facility that the systems administrator manages and defines that the notification should be delivered via email. In an alternate illustration, an author working in a SEW 110 of a cloud-based word processing program, such as Google Docs™ (available from Alphabet, Inc. of Mountain View, Calif.), or a shared session of a hosted word processing program, such as Pages® (available from Apple, Inc. of Cupertino, Calif.), may request a notification that when a batch is triggered, a notification is delivered within the word processing program as a pop-up window (which may automatically close after a defined period of time or require the author to acknowledge the window to dismiss it) or within a notifications pane in the user interface of the word processing program.

Triggers for batches may specify one or more frequencies (e.g., send a report every n minutes) or size requirements (e.g., send a report after n tasks,) and a given batch may include multiple conditions for a trigger or more than one trigger. For example, a receiver 130 may set triggers in a shared document to receive notifications when n words of content have been added by a coauthor or every n minutes, whichever comes first, or both conditions may be part of a single trigger so that a notification is sent when both at least n words have been added and at least n minutes have passed. As will also be appreciated, the receiver 130 may also set triggers for multiple reports so that, continuing the above example, separate reports may be received whenever a coauthor has added n word of content to the shared document and whenever n minutes have passed.

Figure 2:
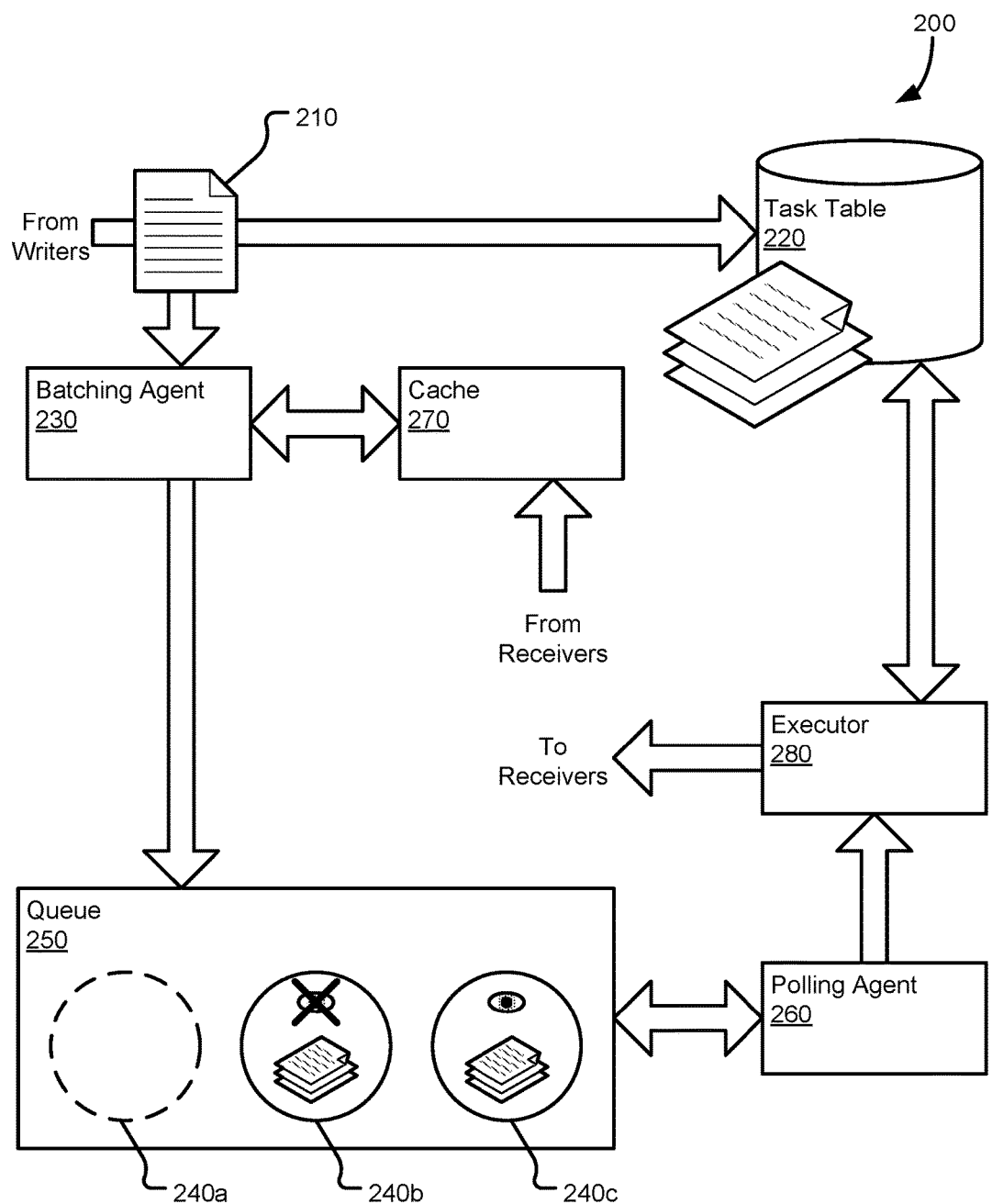
FIG. 2 is a block diagram illustrating interactions and data flow between components used for batching tasks in a shared electronic workspace.

FIG. 2 is a block diagram illustrating interactions and data flow 200 between components used for batching tasks in a SEW 110. As illustrated, incoming tasks 210, received from writers 120, are stored in a task table 220 and are examined by a batching agent 230 on receipt to determine whether an incoming task 210 also belongs in one or more batches 240 in the queue 250. The batching agent 230 consults a cache 270 for batch definitions, received from receivers 130, to determine whether an incoming task 210 is to be added to a batch 240 (individually illustrated as a new batch 240a, a hidden batch 240b, and a visible batch 240c). The queue 250 is polled by a polling agent 260 to pull any visible batches 240c (i.e., those having met their trigger condition) for use by the executor 280, which pulls the tasks comprising the batch 240 from the task table 220 for processing and transmission to the receivers 130. As will be appreciated, the components discussed in regard to FIG. 2 may be implemented on the same computing device as the SEW 110, in combination with the SEW 110 or separately from the SEW 110.

As illustrated, an incoming task 210 is received from a writer 120. In various aspects, the incoming task 210 may be any task within the SEW 110, such as for example, an edit made to a coauthored document, a request to retrieve a file from a document management system, a command to change user settings in a software package, etc. Each incoming task 210 is stored in a task table 220 and examined by a batching agent 230 to determine whether it is to be added to a batch 240. Each incoming task 210 includes various properties, such as, for example, a task type identifier, a writer identifier, a target identifier, etc., that the batching agent 230 uses to determine whether the incoming task 210 belongs in a batch 240.

If the incoming task 210 is determined to not belong to a batch 240, it is added to the task table 220 and to no batches 240, otherwise the incoming task 210 is added to a batch 240 and to the task table 220. When an incoming task 210 is added to the task table 220, a task identifier is assigned to the task for use as a key in recalling that task from the task table 220. That task identifier is also added to the batches 240 in the queue 250 to which the incoming task 210 is assigned (if any). Each batch 240 includes a batch name (to identify the batch 240 in the queue 250), a batching property (to set how the batch 240 is handled when it is triggered), the task identifiers for assigned tasks, a visibility setting (i.e., whether the batch 240 is visible to the polling agent 260), and a timeout (for when the batch 240 is to be removed from the queue 250). In various aspects, a timeout may define a period of time, a number of clock cycles, or a number of polling attempts for how long a given batch 240 will remain in the queue 250 or in a visible state in the queue 250.

The receivers 130 define the properties for tasks that they wish to batch, and the batch definitions are stored in the cache 270, which is consulted by the batching agent 230 to determine which tasks to batch together, and the properties of the batches 240 to create in the queue 250. The definitions stored by the cache 270 are transient and expire after the set period of time for which the receiver 130 is interested in batching. As will be appreciated, a receiver 130 may set up a recurring definition, so that a new definition is automatically created in the cache 270 when the previous definition expires, or the receiver 130 may set up a one-time definition. A user may add batch definitions to the cache 270 on-the-fly, so that incoming tasks 210 meeting the conditions of the batch definition will be added to batches 240.

As illustrated, the batches 240 are shown in three varieties: new batches 240a, hidden batches 240b, and visible batches 240c. New batches 240a are created when an incoming task 210 is received and there is not a hidden batch 240b in the queue 250 for the batch definition that assigned the incoming task 210. As will be appreciated, a task may be assigned to multiple batches 240, and a new batch 240a will be created for a particular definition when a hidden batch 240b does not exist for that definition even if other hidden batches 240b exist for other definitions to which that task was assigned. Batches 240 are created having a hidden visibility state (i.e., as hidden batches 240b) and are not visible to the polling agent 260 when it queries the queue 250. Tasks are accumulated in hidden batches 240b and when the trigger for a hidden batch 240b is reached, it changes its visibility setting to become a visible batch 240c, which the polling agent 260 is operable to see and pull for the executor 280 to operate on. Each visible batch 240c is associated with a timeout property so that the visible batch 240c will be deleted automatically from the queue 250 if it is not pulled by the polling agent 260 or the executor 280 fails to operate on the included tasks within a given period of time so as to not cause stalls or hangs in the SEW 110.

The polling agent 260 periodically polls the queue 250 for any visible batches 240c, which are passed to the executor 280. In various aspects, the frequency at which the polling agent 260 queries the queue 250 may vary, and may be constant, variable, and include interrupts to query the queue 250 outside of the normal frequency. The tasks from the visible batches 240c are pulled from the task table 220 based on the task identifiers that were part of the pulled batch 240. The executor 280 then attempts to operate on the tasks pulled from the task table 220 based on the batching property of the pulled batch 240. Depending on the batching property, the executor 280 may generate and transmit a notification to the receiver 130 regarding the batched tasks, implement the batched tasks via callback operation, and compress the batched tasks (if appropriate). In various aspects, if the executor 280 fails to operate on the batched tasks, it may retry operating on the batched tasks until the batch 240 is deleted from the queue 250 at the end of its timeout period.

Figure 3:
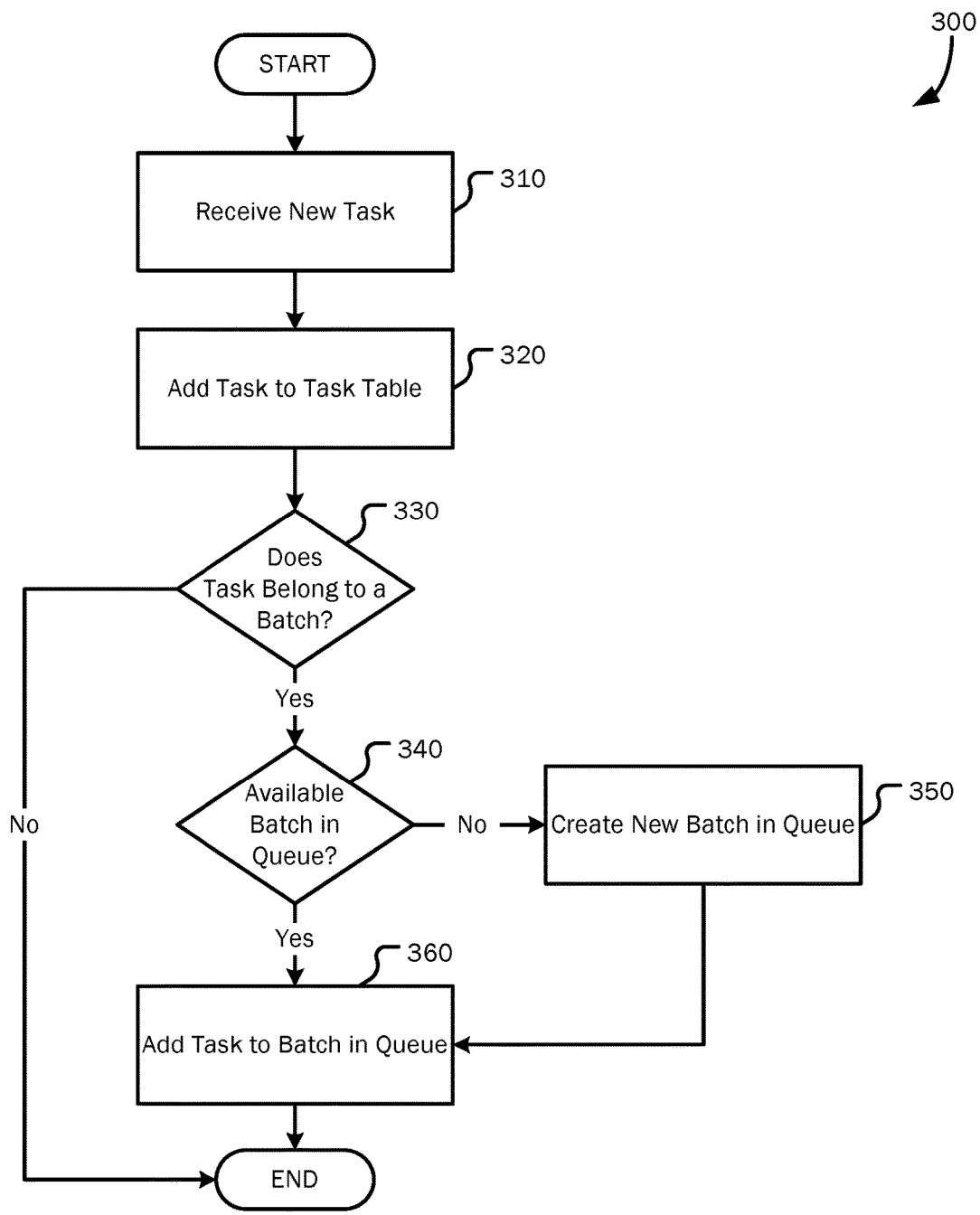
FIG. 3 is a flowchart showing general stages involved in an example method for batching tasks with improved efficiency.

FIG. 3 is a flowchart showing general stages involved in an example method 300 for batching tasks with improved efficiency. Method 300 begins at OPERATION 310, when a new task is received within the SEW 110, and is added to the task table 220 in OPERATION 320. All tasks received within the SEW 110 are added to the task table 220, which may be queried for historic task information, and at DECISION 330, it is determined whether the new task belongs to a batch 240.

At DECISION 330, the properties of the new task are compared against a batch definition stored in a cache 270 to determine whether the new task belongs in one or more batches 240. For example, a first batch definition may define that all changes made by user X in a SEW 110 are to be batched together, and a second definition may define that all changes that add content to the SEW 110 are to be batched together, and a task that includes change from user X that adds content to the SEW 110 would therefore be determined to be assigned to two batches. Contrarily, a task from user Y that removes content from the SEW 110 would belong to neither of the above batch definitions, and would therefore not be added to any batches 240 in this example. If the new task does not belong to any batches 240, method 300 concludes. If the new task does belong to at least one batch 240, method 300 proceeds to DECISION 340.

At DECISION 340 it is determined whether an available batch 240 exists in the queue 250. Available batches 240 are those batches in the queue 250 that have not been made visible to a polling agent 260 or otherwise held aside for execution. If a batch 240 is available for the new task, method 300 will proceed to OPERATION 360, otherwise method 300 proceeds to OPERATION 350.

OPERATION 350 is performed to create a new batch 240a in the queue 250. A new batch 240a is created when there is no hidden batch 240b associated with a batch definition that the new tasks meets, and to which the new task will be added. The new batch 240a is created having a visibility property set to hidden, and its other properties defined by the batch definition. Once the new batch 240a has been created, method 300 proceeds to OPERATION 360.

At OPERATION 360 the new task is added to the hidden batch(es) 240b associated with the batch definition(s) that the new task satisfies. A task is added to a batch 240 by storing its task identifier with the task identifiers for any other tasks that have been previously batched. The identifiers of the batched tasks serve to identify the tasks in the task table 220 so that they may be quickly retrieved when the batch 240 becomes visible and is pulled from the queue 250 for execution. Method 300 then concludes.

Figure 4:
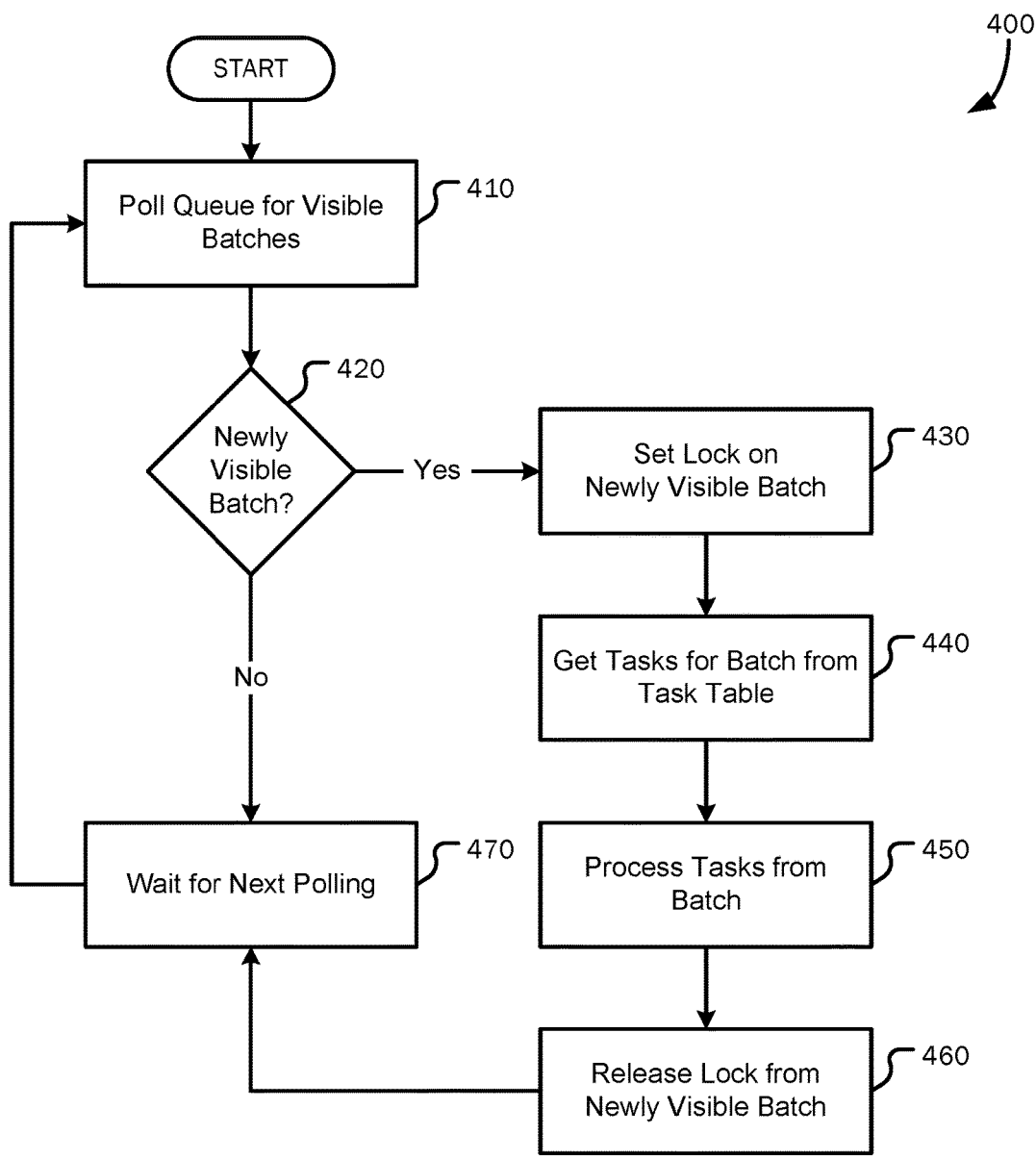
FIG. 4 is a flowchart showing general stages involved in an example method for handling conflicts when batching tasks.

FIG. 4 is a flowchart showing general stages involved in an example method 400 for handling conflicts when batching tasks. Method 400 begins at OPERATION 410, where the queue 250 is polled for visible batches 240c. In various aspects, a polling agent 260 may poll the queue 250 at various frequencies (e.g., every 60 s, every 80 clock cycles), or may poll the queue 250 in response to an interrupt command. At DECISION 420 it is determined whether the queue 250 contains any visible batches 240c that the polling agent 260 has not already polled (i.e., an "unlocked", newly triggered, or newly visible batch 240c). If it is determined there are no newly visible batches 240c in the queue 250, method 400 proceeds to OPERATION 470. If it is determined that there is at least one newly visible batch 240c in the queue 250, method 400 proceeds to OPERATION 430.

At OPERATION 430 the newly visible batch 240c is noted as having been successfully polled from the queue 250 and the polling agent 260 will remember that it has seen the given visible batch 240c (i.e., the polling agent 260 "locks onto" the given visible batch 240c). In various aspects, the polling agent 260 locks onto the newly visible batch 240c by noting the batch name of the visible batches 240c and adding any newly visible batch 240c to a list of visible batches 240c so that a given batch 240 will only be seen by the polling agent as newly visible once.

Proceeding to OPERATION 440, the tasks stored in the batch 240 are retrieved from the task table 220. In various aspects, the batches 240 store the identifiers for the tasks in the task table 220, which are used to retrieve the tasks from the task table 220. In various aspects, the batches 240 store the tasks in an order in which they were received, while in other aspects, the batches 240 will order the tasks by a shared target, source, or category of task for ease of processing.

At OPERATION 450, the tasks from the batch 240 are processed. In various aspects, the tasks are processed via invoking callbacks to the tasks to execute the tasks in the SEW 110, and/or the tasks are processed to create a notification to transmit to a receiver 130. When processing a batch 240 that includes more than one task, the tasks may be combined such that earlier tasks that are undone by later tasks will cancel each other out. For example, a task indicating that a user typed a word and a task indicating that a user deleted that word may be reported by notifying a monitoring user that each task occurred, the end result of those tasks, or not invoking a callback for either task, because the end result of the tasks is that nothing occurred. Further, when a batch 240 includes multiple tasks that are related, the tasks may be combined additively such that the end result, or a summary thereof, is processed. For example, tasks for inputting individual characters to type a word may be combined into one task to indicate that a user typed that word rather than the individual letters. In another example, when multiple tasks for typing multiple words are in a batch 240, a summary of those tasks may be provided in a notification to a receiver 130 (e.g., "n words have been added to paragraph X").

Method 400 then proceeds to OPERATION 460, where the lock is released from the newly visible batch 240c. A lock is released from a batch 240 when the batch 240 has been processed, either in a notification or via a callback to execute the tasks in the SEW 110, or when the batch 240 times out from the queue 250. As will be appreciated, each batch 240 includes a timeout parameter that sets how long the batch 240 will be visible for. When the timeout parameter expires, the batch 240 is deleted from the queue 250, which prevents the batch 240 from consuming too many computing resources (e.g., inducing a hang or stalled process in the SEW 110). In some aspects, when a lock is removed from a batch 240, that batch 240 is deleted from the queue 250, while in other aspects the tasks indicated in the batch 240 are cleared and the batch 240 is made hidden again (clearing any lists tracking the batch 240 as a visible batch 240c) Method 400 then proceeds to OPERATION 470.

At OPERATION 470 the polling agent 260 waits until the next polling signal, which may be internally generated (e.g., a set length of time or a set number of clock cycles have passed) or externally generated (e.g., an interrupt command that directs the polling agent 260 to poll the queue 250). When the polling agent 260 is signaled, method 400 returns to OPERATION 410, where the queue 250 will be polled for any newly visible batches 240c.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
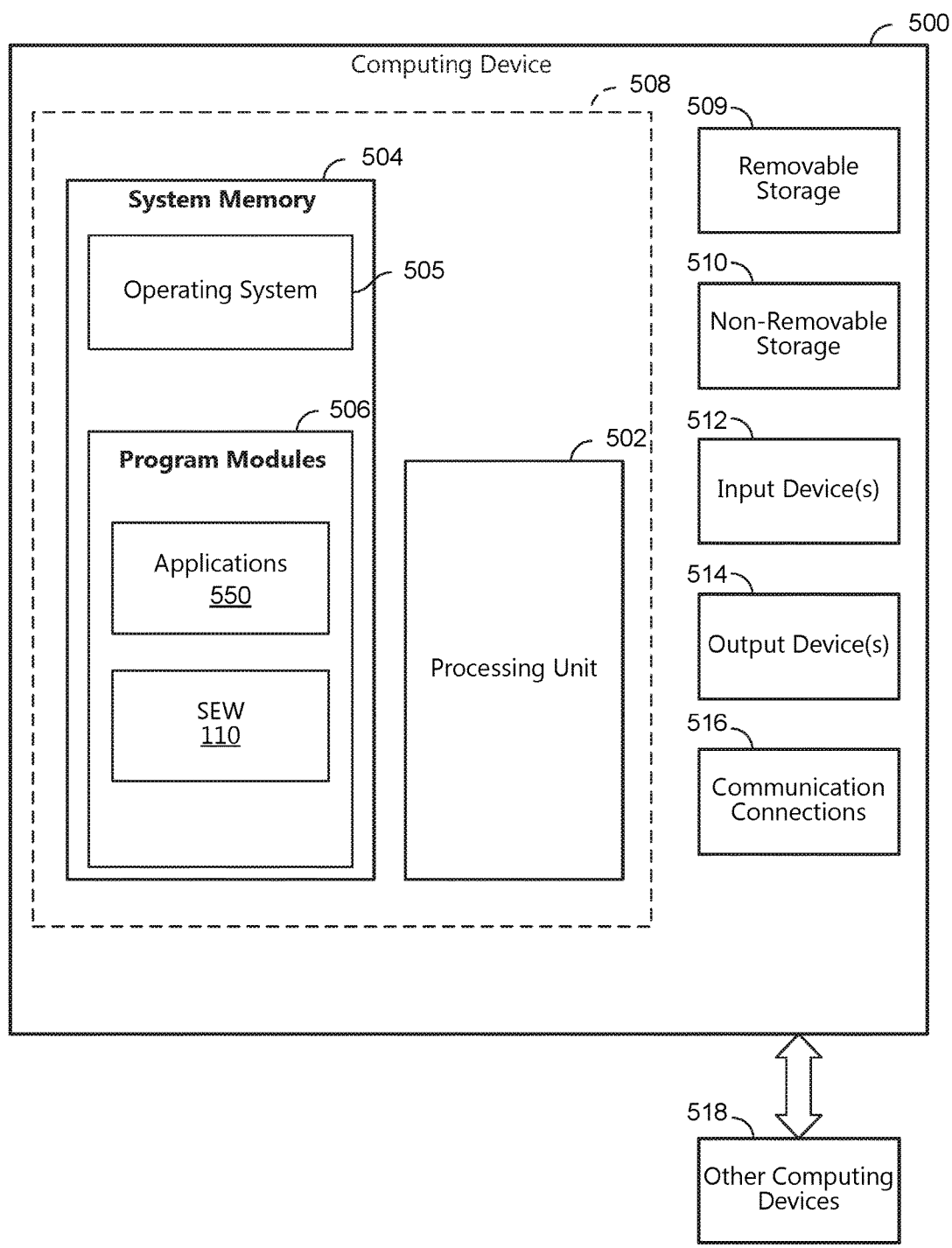
FIG. 5 is a block diagram illustrating physical components of a computing device with which examples may be practiced.
Figure 6A:
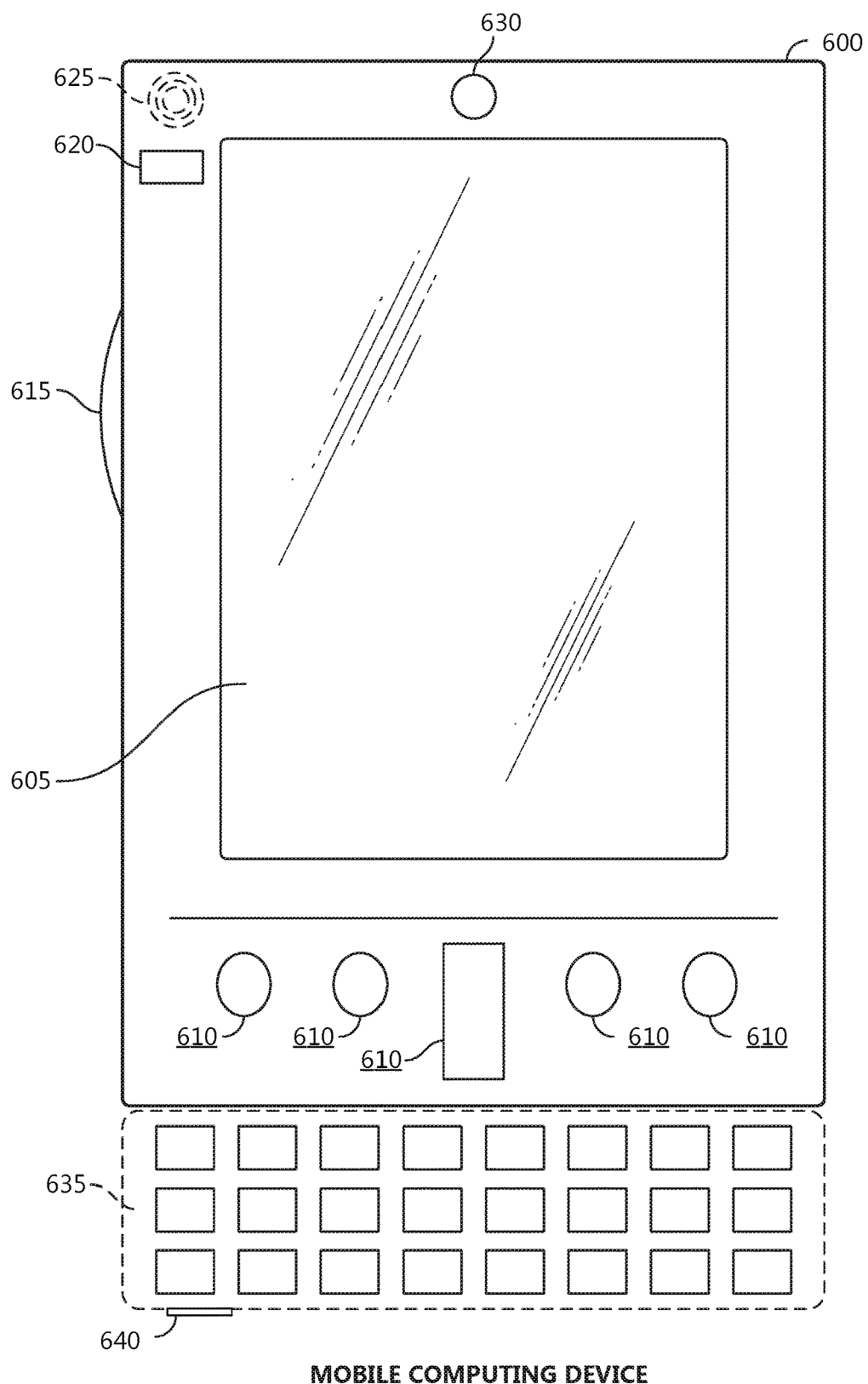
FIGS. 6A and 6B are block diagrams of a mobile computing device with which aspects may be practiced.
Figure 6B:
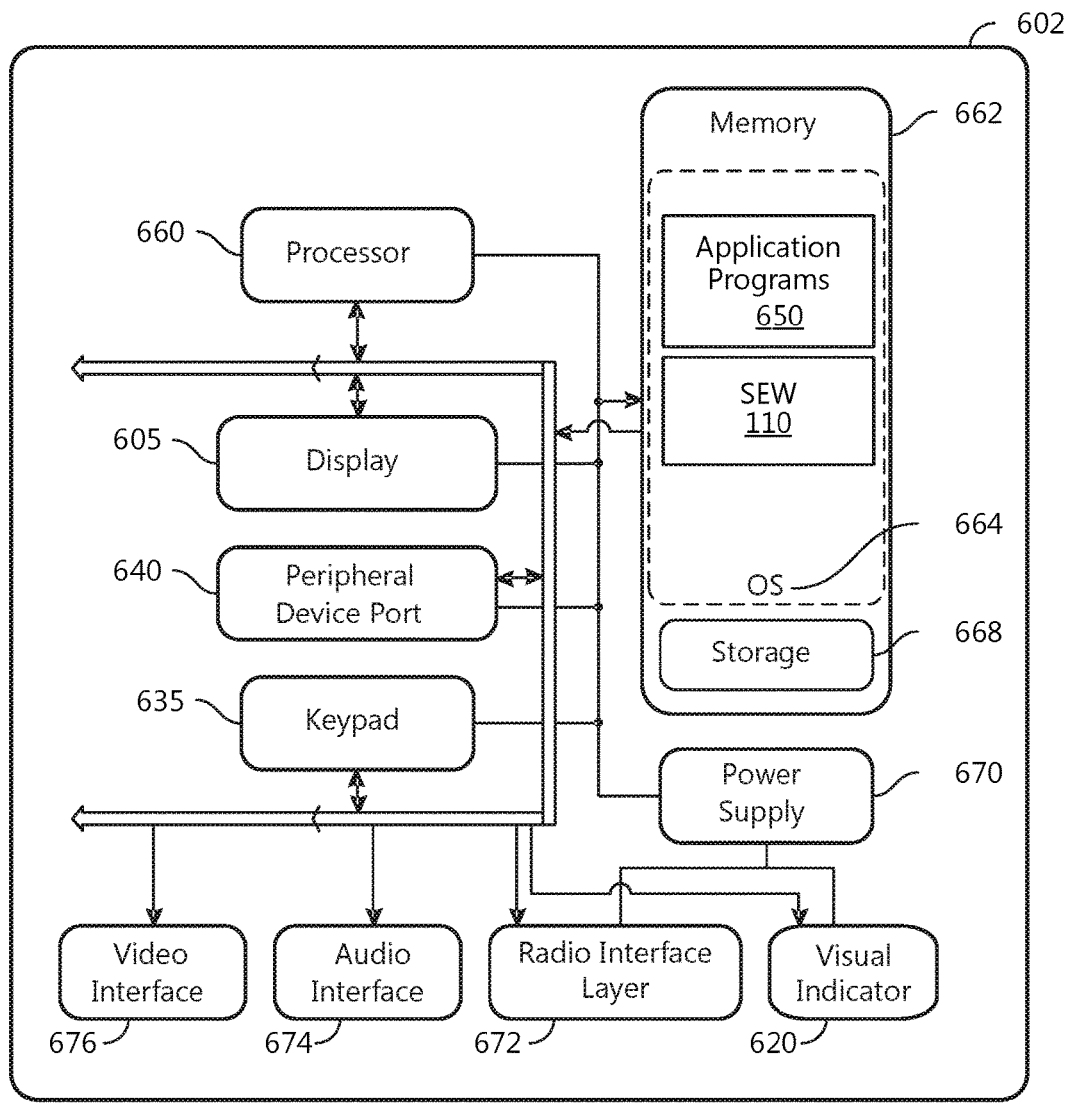
Figure 7:
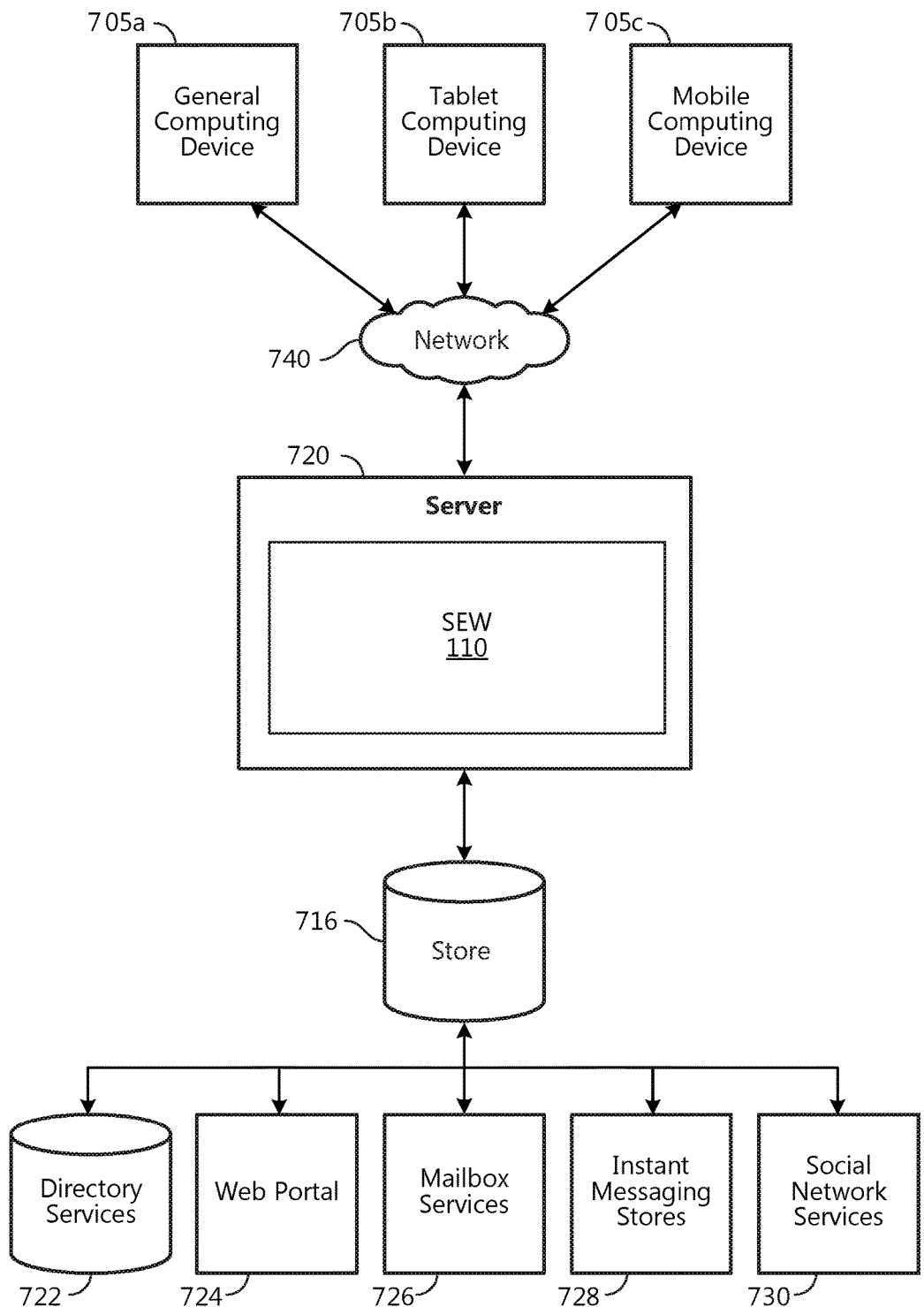
FIG. 7 is a block diagram of a distributed computing system in which aspects may be practiced.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes a SEW 110, operable to enable a software application 550 to employ the teachings of the present disclosure via stored instructions. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., SEW 110) perform processes including, but not limited to, one or more of the stages of the methods 300 and 400 illustrated in FIGS. 3 and 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media apparatuses and articles of manufacture. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage). According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates a peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, SEW 110 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated, such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for automatic presentation of blocks of repeated content as described above. Content developed, interacted with, or edited in association with the SEW 110 is enabled to be stored in different communication channels or other storage types. For example, various documents may be stored using a directory service 722, a web portal 724, a mailbox service 726, an instant messaging store 728, or a social networking site 730. The SEW 110 is operative to use any of these types of systems or the like for distribution of selected content, as described herein. According to an aspect, a server 720 provides the SEW 110 to clients 705*a-c* (generally clients 705), which may be run on writer devices 120 or receiver devices 130. As one example, the server 720 is a web server providing the SEW 110 over the web. The server 720 provides the SEW 110 over the web to clients 705 through a network 740. By way of example, the client computing device is implemented and embodied in a personal computer 705*a*, a tablet computing device 705*b* or a mobile computing device 705*c* (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for reporting tasks taken in a shared electronic workspace (SEW) with improved computational efficiency, comprising:
   receiving a task;
   storing the task in a table;
   determining whether the task belongs in a batch based on a predefined batch definition;
   in response to determining that the task belongs in the batch, determining whether an existing batch is active in a queue;
   in response to determining that the existing batch is active in the queue, adding the task to the existing batch;

determining whether a trigger has occurred for a given batch;

in response to determining that the trigger has occurred for the given batch:
preventing the given batch from receiving additional tasks so that when a second task is determined to belong to the given batch while the given batch is prevented from receiving additional tasks, a new batch is created to which the second task is to be added instead of the given batch;
generating and transmitting a report on tasks belonging to the given batch to a user; and
removing the given batch from the queue.

2. The method of claim 1, wherein when it is determined that no existing batch is active in the queue, creating a new batch and adding the task to the new batch.

3. The method of claim 1, wherein the trigger occurs according to a set period of time.

4. The method of claim 1, wherein the trigger occurs according to a number of tasks included in the given batch.

5. The method of claim 1, wherein the report is an email that is transmitted to an email address associated with the user.

6. The method of claim 1, wherein the report is a dialog in an authoring application of the SEW.

7. The method of claim 1, wherein the batch comprises links to the tasks belonging to the batch, wherein the links point to the tasks in the table.

8. The method of claim 1, wherein the task was made in a writer's instance of the SEW and is received from the writer's instance, and wherein storing the task in the table holds the task for processing in the SEW until the trigger occurs.

9. The method of claim 8, further comprising:
wherein in response to determining that the trigger has occurred for the given batch, the tasks comprising the given batch are processed to affect the SEW.

10. The method of claim 1, wherein counteractive tasks or additive tasks are compressed in the batch.

11. A computer-implemented system for reporting tasks taken in a shared electronic workspace (SEW) with improved computational efficiency, comprising:
a memory having stored programmed instructions; and
a processor for executing the stored programmed instructions, wherein execution of the programmed instructions causes the processor to operate as:
a task table, operable to receive a task performed by a writer in the SEW;
a cache, operable to receive a batch definition from a receiver, wherein the batch definition defines a trigger for an event indicating that a given batch is ready for processing and wherein the batch definition defines criteria for whether a given task belongs to the given batch;
a batching agent, in communication with the cache, operable to examine the task to determine whether the task meets the batch definition and, in response to determining that the task meets the batch definition, assign the task to a batch;
an executor, in communication with the task table and the receiver, operable to receive the batch and in response to receiving the batch, pull the task assigned to the batch from the task table and generate and transmit a report based on the batch to the receiver;
a queue, in communication with the batching agent, operable to maintain the batch, wherein the batch is maintained in a hidden state and or in a visible state for execution, wherein the batch in the hidden state is operable to have additional tasks assigned to the batch and the batch in the visible state is not operable to have the additional tasks assigned, wherein the queue is further operable to change the batch from the hidden state to the visible state in response to the trigger, and wherein in response to the trigger changing the batch from the hidden state to the visible state, the visible state batch is prevented from receiving additional tasks so that when a new task is determined to belong to the visible state batch while the visible state batch is prevented from receiving additional tasks, a new batch is created to which the new task is to be added instead of the visible state batch; and
a polling agent, in communication with the queue and the executor, operable to remove the batch from the queue when the batch is in the visible state to transmit the batch to the executor.

12. The system of claim 11, wherein the task is assigned by the batching agent to the batch and a second batch, defined by a second batch definition.

13. The system of claim 11, wherein the batching agent is further operable to query the queue to determine whether an existing batch corresponding to the batch definition is maintained in the queue in the hidden state;
in response to determining that no existing batch corresponding to the batch definition is maintained in the queue in the hidden state, create a new batch as the batch; and
in response to determining that the existing batch corresponding to the batch definition is maintained in the queue in the hidden state, assign the task to the existing batch as the batch.

14. The system of claim 11, wherein the executor generating and transmitting the report based on the batch to the receiver further comprises combining related tasks comprising the batch.

15. The system of claim 11, wherein the event indicating that the batch is ready for processing is one of:
a number of clock cycles occurring in the SEW;
an amount of time; or
a number of tasks assigned to the batch.

16. The system of claim 11, wherein the executor is further operable to perform the task assigned to the batch in the SEW in response to receiving the batch.

17. A method for reporting tasks taken in a shared electronic workspace (SEW) with improved computational efficiency, comprising:
polling a queue for a batch that is visible, wherein batches include identifiers for tasks performed by a writer in the SEW that meet a batch definition, wherein the batch definition is predetermined, and wherein batches are maintained in the queue as hidden or visible based on a trigger defined by the batch definition;
determining whether the batch is newly visible;
in response to determining that the batch is newly visible:
setting a lock on the batch to indicate that the batch is no longer newly visible;
retrieving the tasks from a task table;
processing the tasks within the SEW; and
releasing the lock from the batch; and
in response to the trigger indicating that the batch is visible but the lock indicating that the batch is no longer newly visible, preventing the visible batch from receiving additional tasks so that when a new task is determined to belong to the visible batch while the visible batch is prevented from receiving additional tasks, a new batch is created to which the new task is to be added instead of the visible batch.

18. The method of claim 17, wherein the SEW is an electronic document being authored remotely by a plurality of writers, wherein a given writer of the plurality of writers has provided the batch definition to receive the tasks performed by other writers of the plurality of writers in response to a trigger defined by the batch definition occurring in the SEW.

19. The method of claim 17, wherein processing the tasks within the SEW further comprises invoking callbacks to execute the tasks within the SEW.

\* \* \* \* \*